Feb. 5, 1952     T. NELSON     2,584,491

MEANS FOR SPOT WELDING

Filed Dec. 21, 1944

INVENTOR
TED NELSON
BY
Charles S. Evans
his ATTORNEY

Patented Feb. 5, 1952

2,584,491

UNITED STATES PATENT OFFICE 2,584,491

MEANS FOR SPOT WELDING

Ted Nelson, San Leandro, Calif., assignor to Gregory Industries, Inc., a corporation of Michigan Application December 21, 1944, Serial No. 569,118

3 Claims. (Cl. 287—20.2)

My invention relates to the art of welding metal together; and the principal object of the invention is the provision of a welding stud for spot welding a sheet or thin plate of metal to another and underlying metal body which may be thin or massive, and without application of an electrode to such underlying body. Another object of the invention is the provision of an expendable electrode by the use of which in a stud welding machine, such spot welding may be done.

My invention possesses other objects and features of value, some of which with the foregoing will be set forth in the following description of the invention. It is to be understood that I do not limit myself to the showing made by the said description and the drawings as I may adopt variant forms of the invention within the scope of the appended claims.

Referring to the drawings:

Figure 1 is an elevation partly in section, showing my expendable electrode in its first position against a plate to be welded to the underlying body. The plate and body where the weld is to be made are shown in section, the plane of section passing through the longitudinal center line of the stud. Figure 2 is a similar view of plate and body after the weld has been made.

Heretofore so far as I am aware, the use of spot welding has been seriously hampered by the necessity of rigging an electrode against the far side of one of the pieces to be welded. Even where the surfaces involved are relatively small, this requirement forces the use of cumbersome equipment including an electrode-carrying arm to range over the rear face of the piece farthest away from the welding machine and operator. Such equipment narrowly limits the field of application of spot welding, and makes it impossible to use in many manufacturing, and building operations, such for example as the welding of large area plates to supporting frames, as in many roof and wall constructions.

In terms of broad inclusion, my method of spot welding contemplates the use of an expendable metal electrode applied to the spot where the welding is to occur. The electrode is held and manipulated by a welding machine or "gun" and the welding circuit is completed through the electrode and the two pieces to be welded, the farther one being grounded. At the instant of welding, the end of the expendable electrode and those near portions of the bodies to be welded which are intermediately in line with the electrode are fused together or coalesced, leaving a slightly raised button or boss on the surface to mark the welded spot.

A similar result is had when the overlying body is apertured with a small hole at the weld site. The hole facilitates the heating of both bodies and is filled with the molten metal which the welding arc produces. In this case, a lighter current may be used for the same thickness of overlying body, or conversely, the same current used for an imperforate overlying body may be used with a heavier overlying body which is apertured.

In detailing the means and method of my invention it will be convenient to assume that a sheet or thin plate 2 is to be spot welded to an underlying body 3. The sheet may be a roof or wall covering and the body 3 may be a beam or supporting frame.

Figure 1:
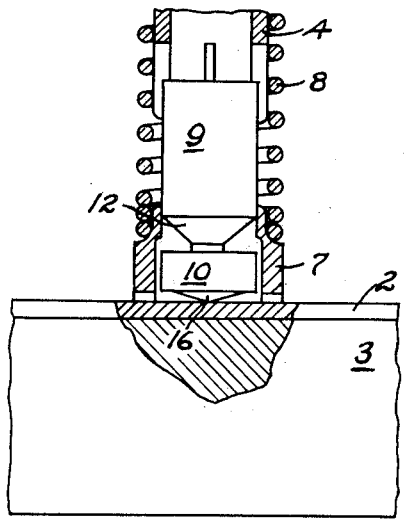
Figure 3:
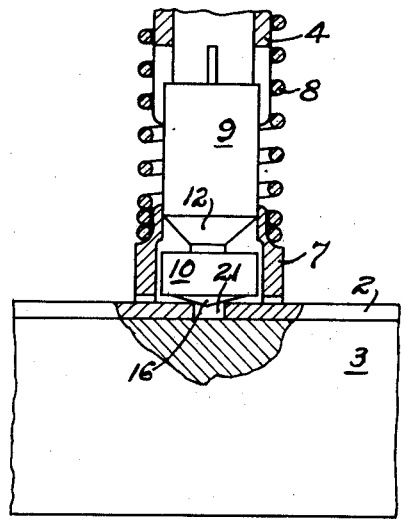
Figures 3 and 4 are views similar to Figures 1 and 2 respectively, but showing a modified procedure.
Figure 5:
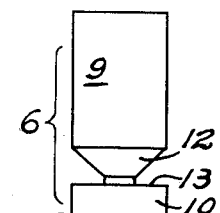
Figure 5 is a side elevation on an enlarged scale of the electrode of my invention.

The requirements for making a weld include a welding machine or gun, preferably of the type shown in United States Letters Patent Number 2,287,818, dated June 30, 1942. The welding current generator is grounded on the body 3 at any convenient place thereon. The gun is provided with a chuck, a part 4 of which is shown in Figures 1 and 3, and in which an expendable electrode 6, Figure 5 is held. The free end of the electrode is preferably surrounded by a ceramic ferrule 7 of the type shown in United States Letters Patent Number Re. 22,411, dated December 21, 1943; and is held in place and pressed against the plate 2 by the spring 8 as more fully explained in the above mentioned reissue patent.

The expendable electrode 6 comprises two main parts, the shank 9, adapted to be held in the chuck of the gun, and the head 10, which is melted off and coalesced with the adjacent material of the plate and shank by the welding arc. The tip 16 of the head 10 preferably contains a flux material as is explained in the above mentioned reissue patent.

The electrode is similar in type to the stud shown in the above mentioned reissue patent, except that the head is separated from the shank by a neck 12. The rear face 13 of the head is substantially flat and perpendicular to the longitudinal axis of the electrode; and the neck extends centrally from the rear face, and then widens out to the full diameter of the shank. The purpose of this construction is to provide a fusible connection between shank and head which permits the head to melt in the welding arc and separate sharply from the remainder of the electrode; or in the event that the neck survives the arc, the neck provides a frangible connection by which the shank may be broken off by a light blow of a hammer.

Figure 2:
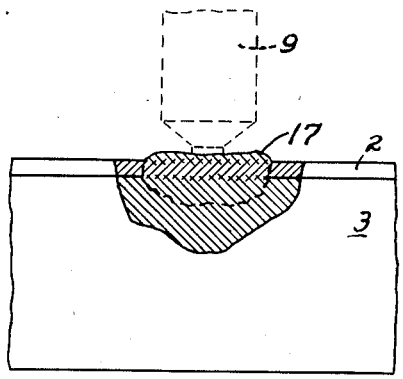
Figure 4:
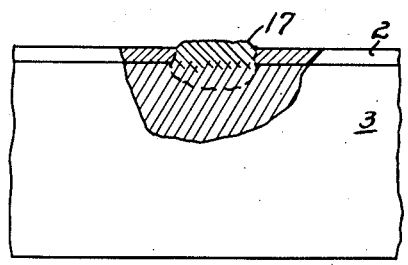

The method of procedure after grounding one side of the generator on the body 3 is to load the gun with an electrode and ferrule, adjusting the stud relative to the gun support so that the head of the electrode projects a short distance beyond the plane of support. The head of the electrode is then placed over the spot where the weld is to be made and the gun seated. This establishes physical contact between the point 16 of the head and the plate 2 so that when the gun is operated to establish the welding current and retract the electrode to draw the arc, the head and adjacent portions of the plate 2 and body 3 are heated. After the proper interval, the electrode is released and the melting head thrust into the molten material of the plate and body, such material, together with the head coalescing in one mass to effect the weld and leaving a low boss or button 17 on the surface of the plate over the welded spot. After the weld is completed, the shank of the electrode is usually connected to the button as indicated in the dotted lines of Figure 2; and after the gun is withdrawn this is readily broken off by a light blow. Sometimes however it may be desirable to have the head 10 melt free of the neck when the weld is made; and in this case the adjustments are such that the head does not quite form contact with the plate when the electrode is released to move toward the plate. If the head does not quite seat in the molten material below, it melts off and merges with such material to form the button.

Sometimes it is desirable to put perforations 21 in the overlying plate over the site of the weld and this procedure is illustrated in Figure 3. In this case the hole in the plate facilitates the heating of the plate and underlying body and permits a somewhat thicker plate to be welded than is otherwise possible with the same current. When the heated electrode is plunged into the molten material of plate and underlying body, upon release of the electrode, the head merges with the material, filling the hole and forming a low boss or button above the site of the weld. When the shank of the electrode is left projecting from the boss, it may be detached by a light blow.

Figure 6:
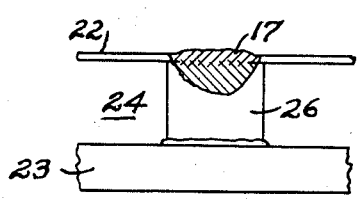
Figure 6 is an end view, partly in section and showing one of many applications of my invention.

In Figure 6 another application of my invention is shown. A thin plate 22 is to be securely fastened at a fixed distance from a wall 23. Such a structure is useful in various constructions where a dead air space 24 is required for insulation or circulation of warm air. A plurality of studs 26 of the required length are first welded over the surface of the wall 23. These welds are preferably accomplished in the manner made clear in my above mentioned patents; or the studs 26 are of the type and are applied in the manner disclosed in my copending application Serial No. 569,119, now Patent No. 2,477,765, dated August 2, 1949, executed before Glenn H. Spencer, a notary public in and for the county of Alameda, State of California, on December 7, 1944, and filed on the same day as this application. The surfacing plate 22 is next applied against the ends of the studs and held by any suitable temporary means. If the plate is sufficiently light, the underlying stud can be readily located by a blow of a soft hammer which will outline the stud through the plate. If the plate 22 is of relatively heavy gauge, the studs may be located by measurement and the weld site marked by a prick punch or otherwise. With the location of the stud fixed on the plate, the spot weld is made as already described, appearing as in Figure 6. By proper proportioning of the length of the head of the electrode, it is possible to complete these welds with a low and inconspicuous button 17.

I claim:

1. A fusible electrode comprising a stud, and a welding flux arranged at one end of the stud, said stud having an annular groove adjacent the fluxed end and dividing the electrode into a fusible head and a chuck receiving body.

2. A fusible electrode comprising a stud, and a welding flux arranged at one end of the stud, said stud having an annular groove adjacent the fluxed end and dividing the electrode into a fusible head and a substantially cylindrical chuck receiving body, the groove being shaped to provide a face on the fusible head substantially perpendicular to the stud axis and a tapered face on the chuck receiving body, said tapered face extending from a narrow central neck joining the head and body outwardly to the cylindrical surface of the chuck receiving body.

3. A fusible electrode comprising a stud having a fusible head portion, a body portion, and a relatively small frangible neck portion, said head portion containing a flux material and being connected with said body portion by said neck portion.

TED NELSON.

REFERENCES CITED

The following references are of record in the file of this patent:

UNITED STATES PATENTS

| Number | Name | Date |
| --- | --- | --- |
| Re. 22,411 | Nelson | Dec. 21, 1943 |
| 1,169,642 | Heeter et al. | Jan. 25, 1916 |
| 1,330,241 | Cutter | Feb. 10, 1920 |
| 2,096,495 | Hogg | Oct. 19, 1937 |
| 2,134,705 | Crecca | Nov. 1, 1938 |
| 2,268,416 | Nelson | Dec. 30, 1941 |
| 2,355,579 | Wing | Aug. 8, 1944 |
| 2,413,370 | Palmer | Dec. 31, 1946 |